(12) United States Patent
Grady et al.

(10) Patent No.: US 8,291,579 B2
(45) Date of Patent: Oct. 23, 2012

(54) GEARED INSERTION APPARATUS FOR A PCA

(75) Inventors: John R. Grady, Cypress, TX (US); Carl Massey, Tomball, TX (US); Joseph R. Allen, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/012,504

(22) Filed: Jan. 24, 2011

(65) Prior Publication Data
US 2012/0186076 A1 Jul. 26, 2012

(51) Int. Cl.
*H01R 43/00* (2006.01)
(52) U.S. Cl. .................. 29/758; 29/760; 29/761; 29/739
(58) Field of Classification Search .................... 29/729, 29/739, 753–761, 592.1; 81/57.31; 83/397, 83/471.2; 144/253.1, 286.1
See application file for complete search history.

(56) References Cited

U.S. PATENT DOCUMENTS

| 1,090,575 | A | * | 3/1914 | Shannon | 269/98 |
| 4,334,353 | A | * | 6/1982 | Holt | 29/753 |
| 4,461,074 | A | * | 7/1984 | Holt | 29/749 |
| 6,408,531 | B1 | * | 6/2002 | Schimmels | 33/644 |
| 2002/0030972 | A1 | * | 3/2002 | Ali et al. | 361/704 |

\* cited by examiner

*Primary Examiner* — Minh Trinh
(74) *Attorney, Agent, or Firm* — Steven L. Webb

(57) ABSTRACT

A apparatus for mounting an interposer PCA into a chassis is disclosed. The apparatus comprises a bracket attached to the PCA. A geared handle is rotatably attached to one end of the bracket. The geared handle is configured to rotate between an open position and a closed position. Two geared segments are rotatably attached to the opposite end of the bracket and are meshed with the geared handle. A slot is formed in each geared segment and two slots are formed in the geared handle. The slots engage with insertion/ejection flanges on the chassis. The engaged slots force the PCA down into mating connectors in the chassis when the handle is rotated from the open position to the closed position.

12 Claims, 6 Drawing Sheets

GEARED INSERTION APPARATUS FOR A PCA

BACKGROUND

An interposer printed circuit assembly (PCA) is typically a PC board loaded with two or more connectors. The interposer PCA is used to couple two different devices together. Some interposer PCAs are used to connect two different devices inside a server chassis. An interposer PCA may be as simple as an electrical connection from which another connector emerges or as complex as a protocol conversion device. Some interposer PCAs use high insertion force connectors. These high insertion force connectors may require as much as 36 lbs of force (each) to properly insert the interposer PCA onto the two devices. The high insertion force connectors also require as much as 25 lbs of force (each) to separate/remove the connector.

DETAILED DESCRIPTION

FIGS. 1-5, and the following description depict specific examples of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Some interposer PCAs use high insertion force connectors. Because of the high forces required by the connectors, problems occur during insertion and removal of the interposer PCA. In some instances an interposer PCA with multiple connectors may not be properly aligned with the mating connectors before the connectors begin engagement. Once the connectors begin engagement, the insertion force may not be evenly distributed, causing an angular insertion of the connectors instead of a linear insertion. Angular insertion of the connectors may cause damage to the connector pins. In addition, some interposer PCA never become fully engaged with the mating connectors. Some interposer PCA require two hands to insert.

Figure 1:
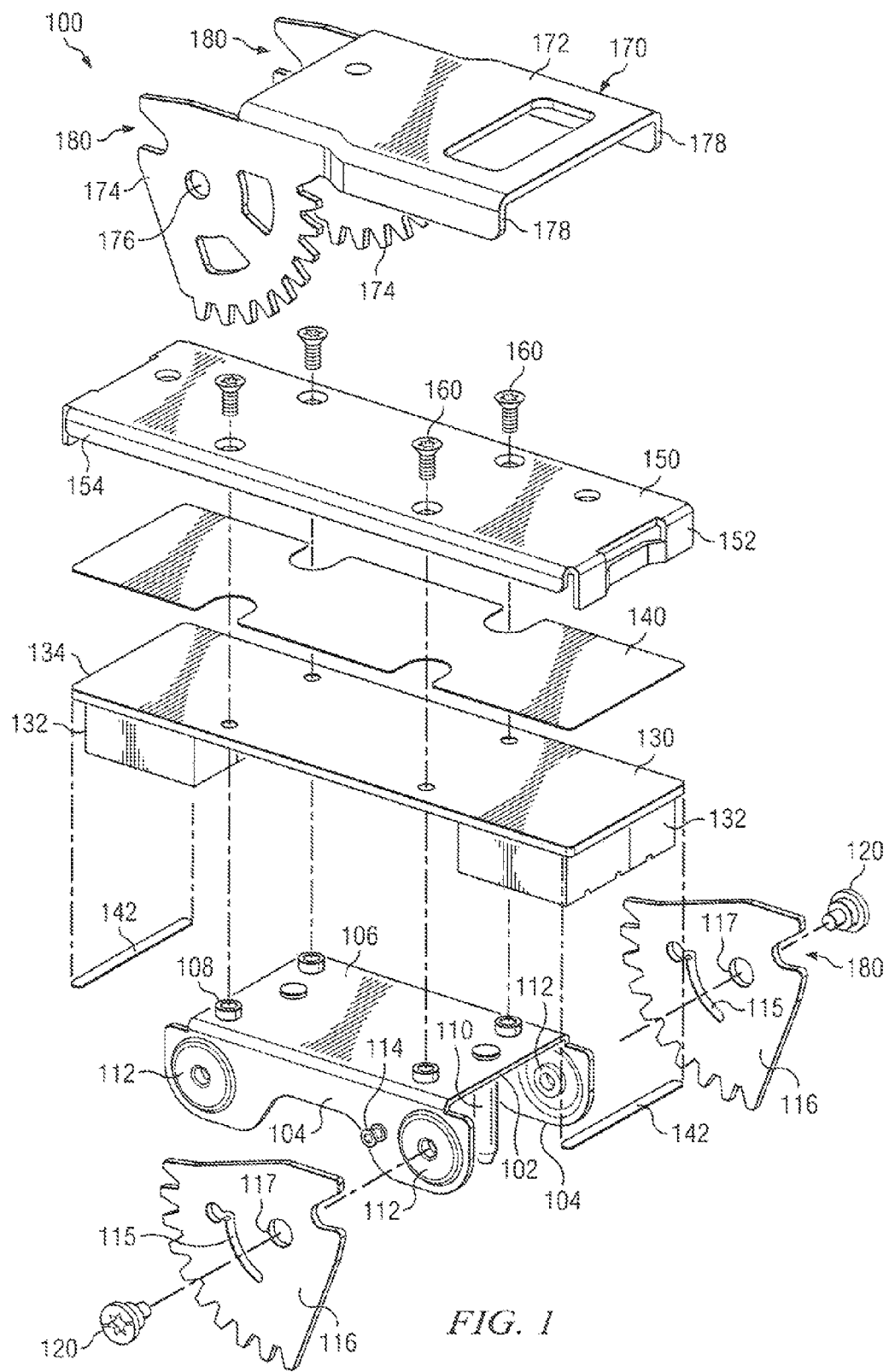
FIG. 1 is an exploded view of a geared insertion apparatus 100 for a printed circuit assembly (PCA) in an example embodiment of the invention.

FIG. 1 is an exploded view of a geared insertion apparatus 100 for a printed circuit assembly (PCA) in an example embodiment of the invention. Geared insertion apparatus 100 comprises a bracket 102, 2 gear segments 116, a PCA 130, an isolator sheet 140, two isolator strips 142, a stiffener plate 150, a geared handle 170, 4 shoulder screws 120 and 4 screws 160. PCA 130 comprises a PC board 134 with two high insertion force connectors 132 mounted onto the bottom side of PC board 134.

PCA 130 is captured between bracket 102 and stiffener plate 150 using 4 screws 160 that mate with threaded standoffs 108 mounted to bracket 102. Isolator sheet 140 is placed between PCA 130 and stiffener plate 150 to prevent electrical contact between PC board 134 and stiffener plate 150. In some example embodiments, isolator sheet 140 may be held in place with double sided adhesive. Stiffener plate 150 may have its side edges 154 folded over to increase the stiffness of the stiffener plate 150. Stiffener plate 150 may also have its ends 152 folded over to increase the stiffness of the stiffener plate 150. In addition the folded ends 152 may create a feature that aligns PCA 130 to a predetermined position with respect to bracket 102. Isolator strips 142 may be attached to the bottom of PCA 130 to add protection from contact with mechanical components.

Bracket 102 comprises a generally flat base 106, 2 side panels 104, 2 alignment, pins 110, 4 threaded standoffs 108, 4 clinch nuts 112 and two stop pins 114. The two side panels 104 extend downward perpendicular to base 106. The 4 threaded standoffs 108 are mounted to the top side of base 106. The 2 alignment pins 110 are mounted on the bottom side of base 106 at each end of the base. The two alignment pins may be oriented such that the geared insertion apparatus can only be installed in the correct orientation, thereby preventing the interposer PCA from being installed backwards. Two of the clinch nuts 112 are mounted into each side panel 104, one at each end.

Geared handle 170 comprises a handle section 172 and two gear segments 174. Handle section 172 is a generally flat part that may have the sides 178 folded over to increase the stiffness of the handle section. The two gear segments 174 are generally flat plates attached to the sides of the handle section at one end of the handle section, with one gear segment attached to each side. The gear segments are generally perpendicular to the flat handle section 172 and parallel with each other. Each gear segment 174 has teeth along the edge of the gear segment that is towards the middle of the handle section 172. A slot 180 is formed in each gear segment on the opposite edge from the teeth. A mounting hole 176 is formed in each gear segment between the slot 180 and the teeth. The two mounting holes form an axis of rotation for the geared handle 170.

Geared handle 170 is rotatably attached to bracket 102 using two shoulder screws 120. The two shoulder screws 120 mate with two clinch nuts 112 mounted in each side panel 104 at one end of bracket 102. The two shoulder screws 120 fit within the two mounting holes 176 in the geared handle 170 and allow geared handle 170 to rotate about the axis of rotation even after the two shoulder screws 120 have been fully tightened.

The two gear segments 116 are generally flat plates. Each gear segment 116 has teeth formed along one edge of the gear segment and a slot 180 is formed on the opposite edge from the teeth. A mounting hole 176 is formed in each gear segment between the slot 180 and the teeth. Each gear segment 116 has a motion control slot 115 formed between the mounting hole 117 and the teeth.

The two gear segments 116 are mounted onto the side panels 104 of bracket 102 on the opposite end from the geared handle 170, with one geared segment 116 mounted to each side panel 104. The two geared segments 116 are attached to side panels 104 using two shoulder screws 120 that mate with the clench nuts 112 mounted in each side panel 104. The shoulder screws 120 fit within mounting holes 117 and allow each geared segment 116 to rotate even after the two shoulder screws have been fully tightened. Each geared segment 116 is aligned such that its teeth mesh with the teeth of the geared handle such that when the geared handle is rotated it causes both geared segments to rotate. The motion control slots 115 in each geared segment 116 mate with a stop pin 114 attached to each side panel 104. The motion control slots 115 and stop pins 114 control the range of rotation for the two gear segments 116 as well as the geared handle 170. In another example embodiment, the stop pins and motion control slots can be located on the handle side of the bracket.

Figure 2A:
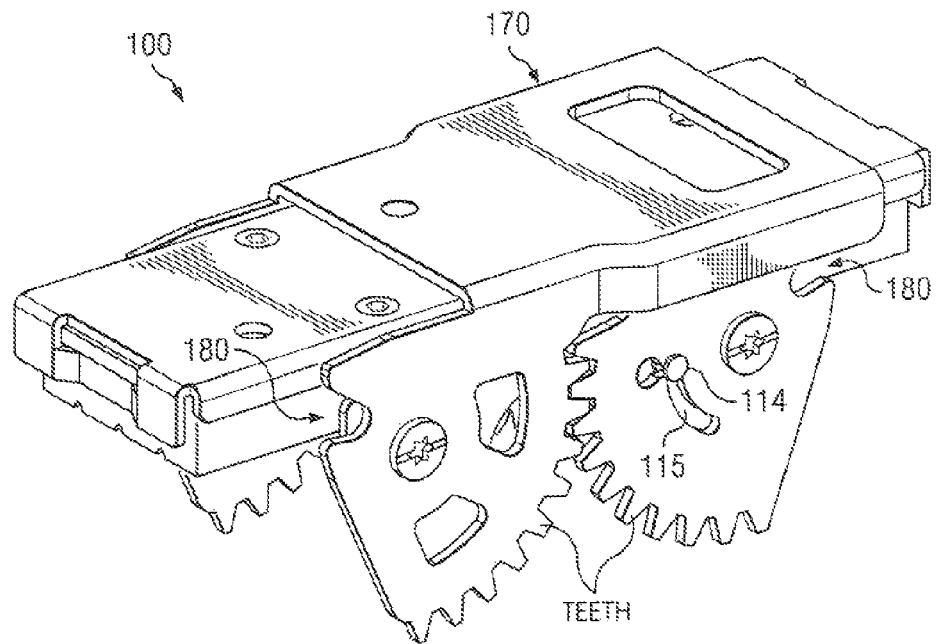
FIG. 2A is an isometric top view of geared insertion apparatus 100 with geared handle 170 shown in the closed position, in an example embodiment of the invention.
Figure 2B:
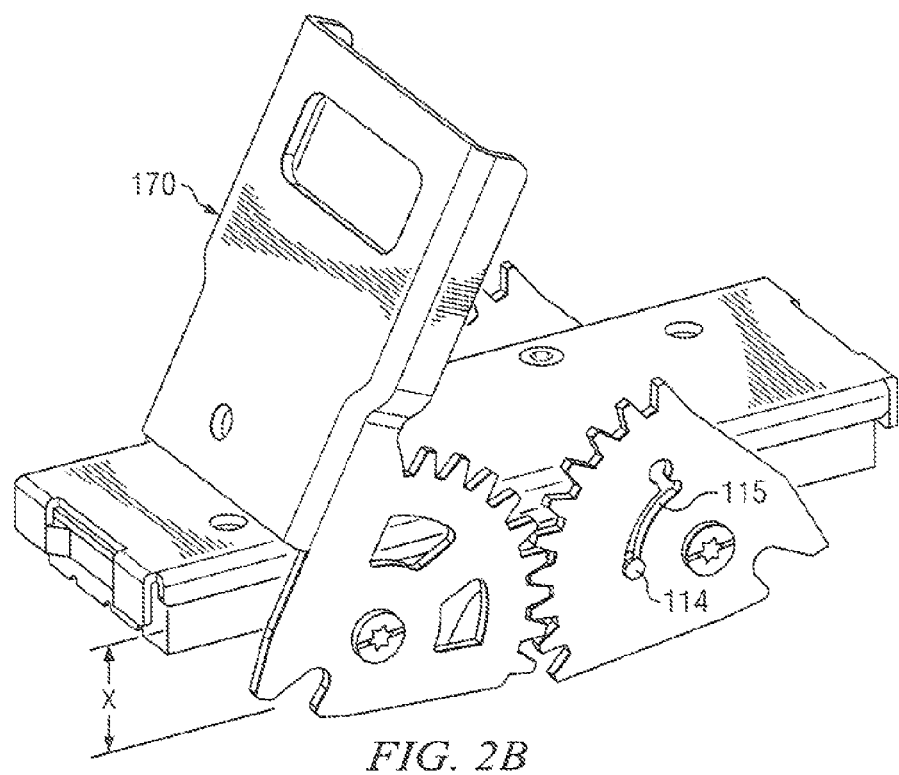
FIG. 2B is an isometric top view of geared insertion apparatus 100 with geared handle 170 shown in the open position, in an example embodiment of the invention.

FIG. 2A is an isometric top view of geared insertion apparatus 100 with geared handle 170 shown in the closed position, in an example embodiment of the invention. FIG. 2B is an isometric top view of geared insertion apparatus 100 with geared handle 170 shown in the open position, in an example embodiment of the invention. When geared handle 170 is in the closed position, stop pin 114 is at one end of motion control slot 115. When geared handle 170 is in the open position, stop pin 114 is at the other end of motion control slot 115. The position of slot 180 moves distance X when geared handle 170 is moved between the open and closed positions.

Figure 3:
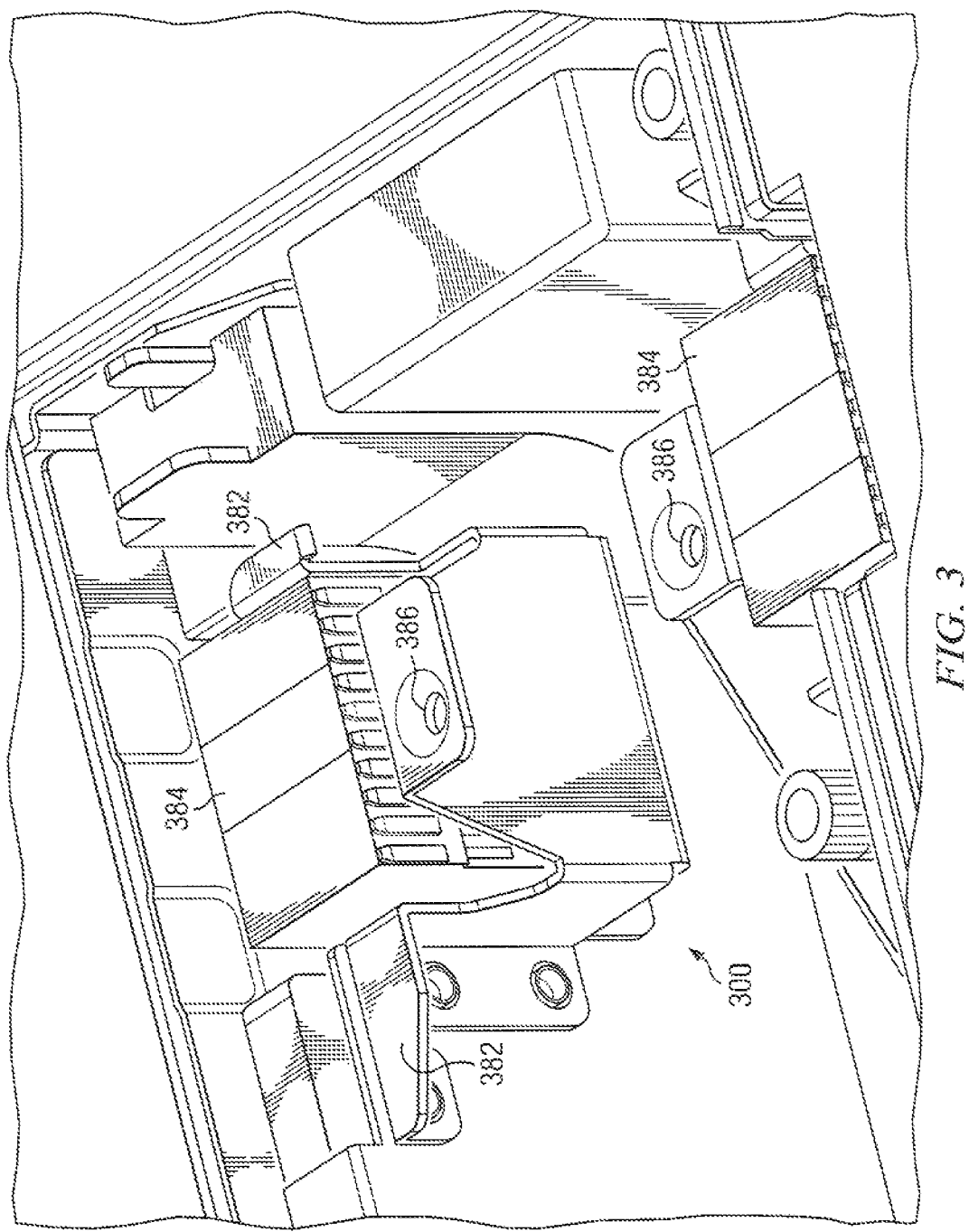
FIG. 3 is an isometric partial top view of a chassis 300 in an example embodiment of the invention.

FIG. 3 is an isometric partial top view of a chassis 300 in an example embodiment of the invention. Geared insertion apparatus 100 is used to insert a printed circuit assembly (PCA) into the chassis 300. Chassis 300 comprises at least two high insertion force connectors 384, two alignment pin receptacles 386, and 4 insertion/ejection flanges 382 (only two are visible). The two alignment pin receptacles 386 mate with alignment pins 110 on geared insertion apparatus 100. The high insertion force connectors 384 mate with and couple to the high insertion force connectors 132 on geared insertion apparatus 100. The insertion/ejection flanges 382 mate with the slots 180 on the geared segments and on the geared handle.

Figure 4A:
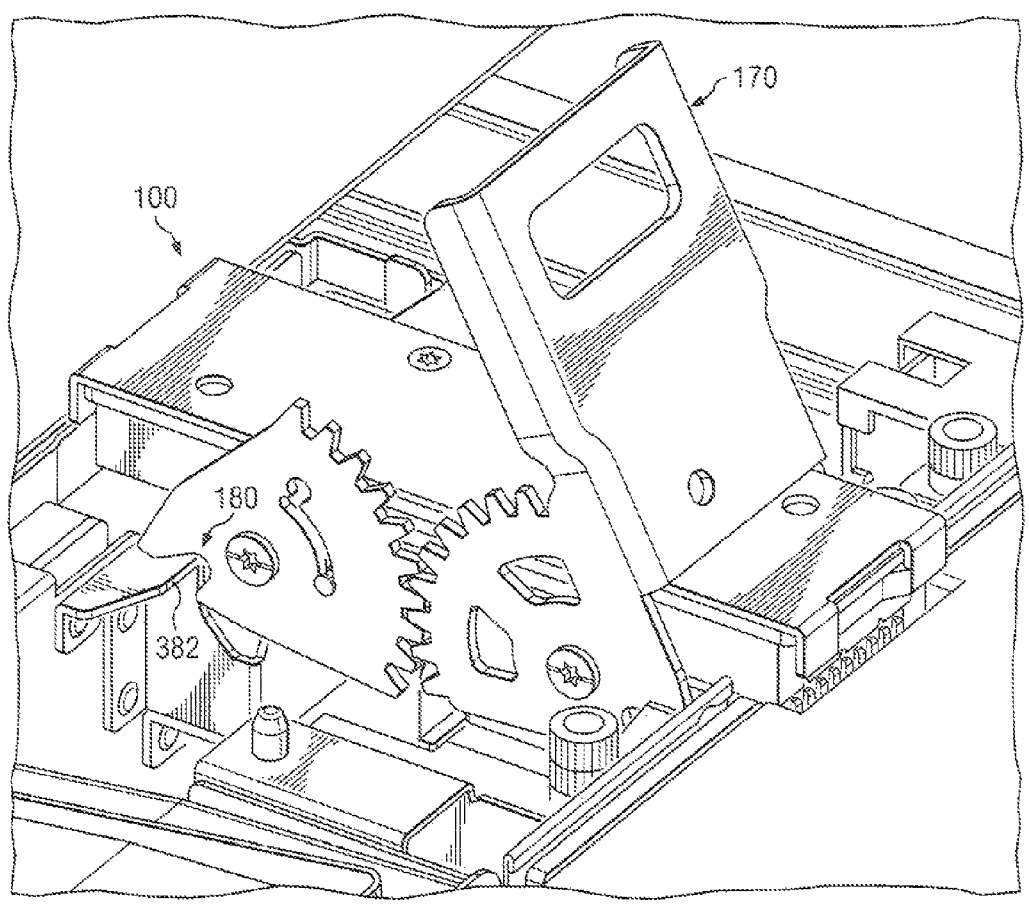
FIGS. 4A and 4B are isometric top views of geared insertion apparatus 100 being installed into chassis 300.
Figure 4B:
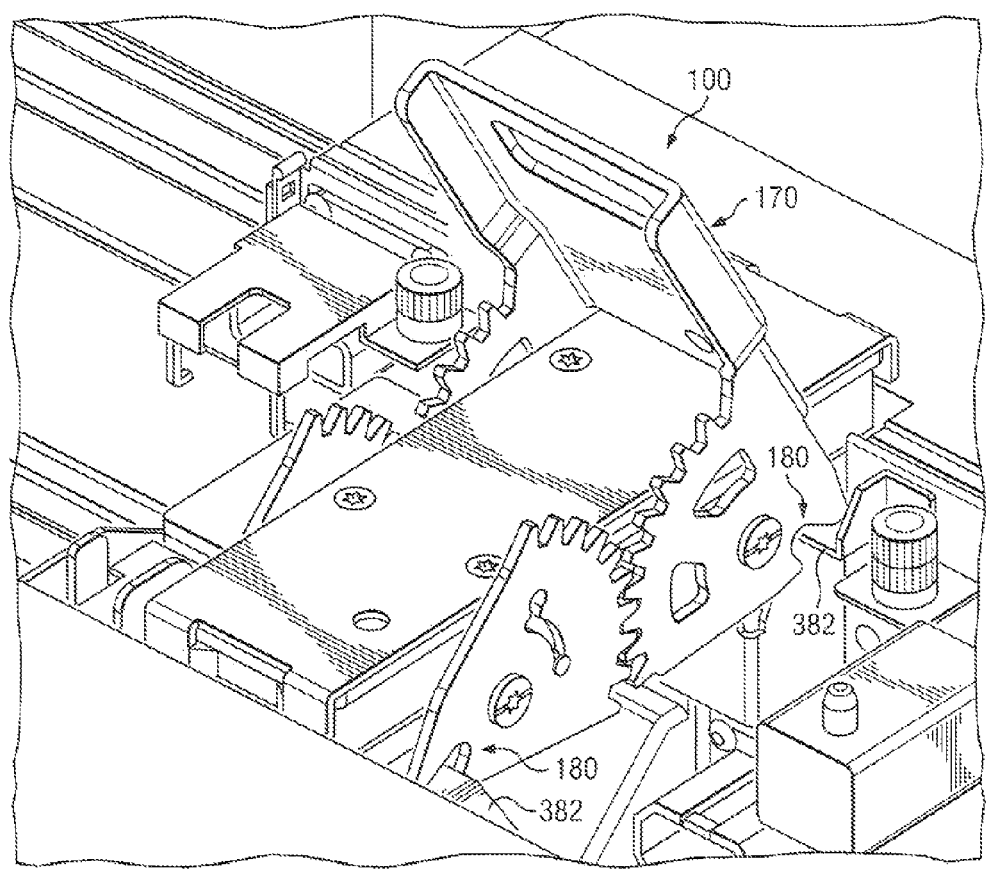
Figure 5:
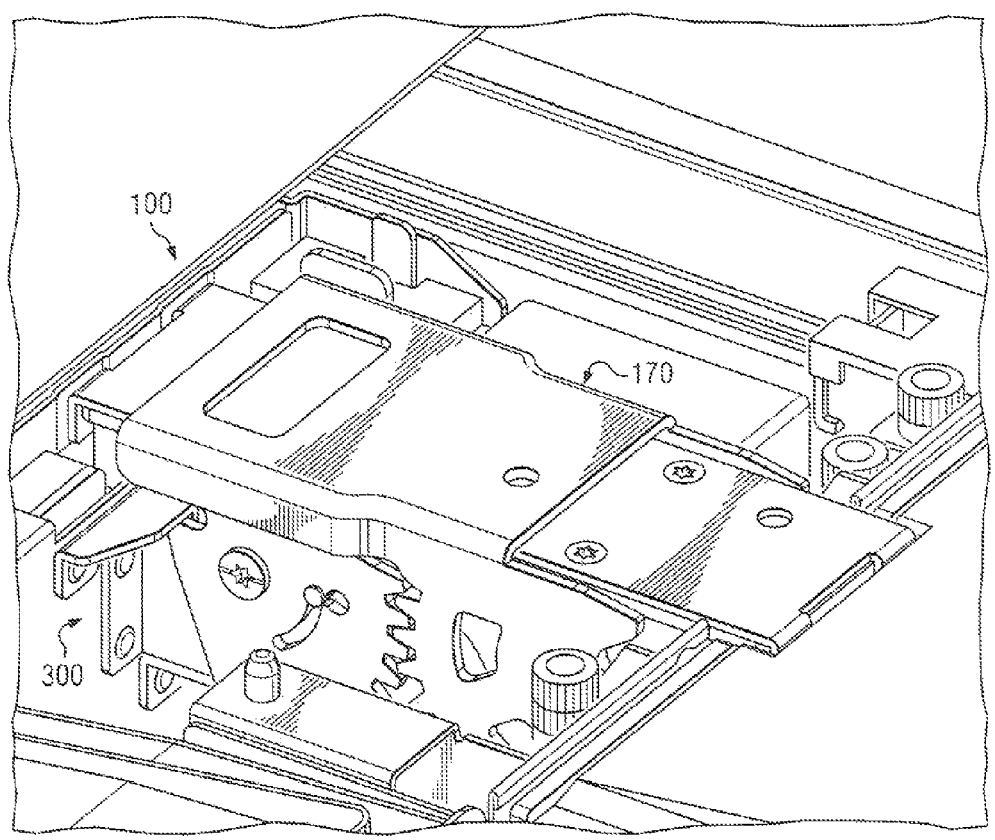
FIG. 5 is an isometric top view of geared insertion apparatus fully installed into chassis 300 in an example embodiment of the invention.

FIGS. 4A and 4B are isometric top views of geared insertion apparatus 100 being installed into chassis 300. When geared insertion apparatus is being installed into chassis 300, geared handle 170 is in the open position. As the geared insertion apparatus 100 is being lowered into chassis 300, alignment pins 110 engage with alignment pin receptacles 386 to position the connectors 132 on the geared insertion apparatus 100 with their mating connectors 384 in the chassis 300. The alignment pins are sized to align the connectors before the connectors begin engagement. As the geared insertion apparatus 100 is being lowered into the chassis, slots 180 on the two gear segments and on the geared handle engage with the insertion/ejection flanges 382 on the chassis. Once the slots 180 have engaged the insertion/ejection flanges 382 the geared handle is rotated from the open position to the closed position. As the geared handle is being rotated from the open position to the closed position, slots 180 engage with insertion/ejection flanges 382, causing the geared insertion apparatus 100 to be forced downward by distance X. Distance X is arranged to ensure that the connectors 132 on the geared insertion apparatus 100 are fully engaged with their mating connectors 384 in the chassis 300 when the handle 170 is in the closed position. Distance X is arranged to ensure that the connectors 132 on the geared insertion apparatus 100 are fully disengaged with their mating connectors 384 in the chassis 300 when the handle 170 is rotated into the open position. FIG. 5 is an isometric top view of geared insertion apparatus fully installed into chassis 300 in an example embodiment of the invention. Geared handle 170 is in the closed position.

To remove the geared insertion apparatus 100 from the chassis 300, the geared handle 170 is rotated from its closed position into its open position. As the geared handle 170 rotates, slots 180 force geared insertion apparatus 100 upward from chassis thereby disengaging the connectors 132 on the geared insertion apparatus 100 from their mating connectors 384.

In some example embodiments of the invention, the connectors are high insertion force connectors. Some high insertion force connectors require an insertion force of 36 lbs and a removal force of 25 lbs. When the geared insertion apparatus 100 comprises two high insertion force connectors, 70 lbs of force is required to install the two connectors with their mating parts. Because of the geared action of the geared insertion apparatus 100, the user is only required to use 16.5 lbs of force to install the geared insertion apparatus 100 into a chassis 300 and 14.35 lbs to remove the geared insertion apparatus 100 from the chassis 300. 16.5 lbs is a 77% reduction in the force required to install an interposer PCA 130 into a chassis 300. The alignment pins 110 on the geared insertion apparatus 100 also ensures that the connectors are aligned with their mating parts before engagement of the connectors begins. The position of the slots 180 on the four corners of the geared insertion apparatus 100 help to balance the insertion force so that the engagement of the connectors is linear.

In the example shown, the slots 180 are shown formed in the geared segments and the slots 180 engage with insertion/ejection flanges 382 in the chassis 300. In other example embodiments the slots 180 and flanges 382 may be switched such that flanges/tabs 382 are formed on the geared segments and the slots 180 are formed in the chassis 300.

What is claimed is:

1. An apparatus, comprising:
a bracket having a generally flat base with two side panels extending downwards perpendicular to the base;
a handle with a first pair of gear segments extending downwards from opposite sides of one end of the handle wherein the first pair of gear segments are parallel to each other, where each of the first pair of gear segment has teeth on one edge and a slot formed on the opposite edge, the handle rotatably mounted to the two side panels at one end of the bracket and configured to rotate between an open position and a closed position;
a second pair of gear segments rotatably mounted to the two side panels at an opposite end of the bracket, where each of the second pair of gear segment has teeth on one edge and a slot formed on the opposite edge, wherein the teeth of the second pair of gear segments are meshed with the teeth of the first pair of gear segments such that when the handle is rotated the second set of gear segments also rotate;
an interposer printed circuit assembly (PCA) comprising a printed circuit (PC) board and two connectors attached to a bottom side of the PC board, the PCA attached to a top side of the bracket;
wherein the slots are configured to engage four insertion/ejection flanges on a chassis, wherein when the handle is rotated from the open position to the closed position the slots engage the insertion/ejection flanges on the chassis and force the connectors into mating connectors mounted in the chassis.

2. The apparatus of claim 1, wherein the slots displace a distance X when the handle is rotated from the open position to the closed position and where X is selected to ensure that the connectors on the PC board are fully engaged with the mating connectors in the chassis.

3. The apparatus of claim 2, where X is selected to ensure that the connectors on the PC board are fully disengaged with the mating connectors in the chassis when the handle is rotated from the closed position to the open position.

4. The apparatus of claim 1, further comprising:
two alignment pins attached to the bottom side of the bracket and configured to engage alignment pin receptacles in the chassis to align the two connectors on the PC board with the mating connectors mounted in the chassis before the two connectors on the PC board engage the mating connectors mounted in the chassis.

5. The apparatus of claim 4, wherein the two alignment pins are arranged such that the apparatus can only be inserted into the chassis in one orientation.

6. The apparatus of claim 1, wherein the connectors on the PC board are inserted into the mating connectors mounted in the chassis in a linear motion.

7. The apparatus of claim 1, further comprising:
a stiffener plate attached to the top side of the bracket capturing the PCA between the bracket and the stiffener plate.

8. The apparatus of claim 7, further comprising:
an insulator sheet attached between the PCA and the stiffener plate.

9. The apparatus of claim 1, wherein the apparatus can be inserted into the chassis by rotating the handle from the open position to the closed position using less than 18 lbs of force.

10. The apparatus of claim 1, wherein the apparatus can be removed from the chassis by rotating the handle from the closed position to the open position using less than 16 lbs of force.

11. The apparatus of claim 1, further comprising:
a stop pin extending from one of the side panels, the stop pin fitting inside a motion control slot formed in one of the geared segments.

12. An apparatus, comprising:
a bracket having a generally flat base with two side panels extending downwards perpendicular to the base;
a handle with a first pair of gear segments extending downwards from opposite sides of one end of the handle wherein the first pair of gear segments are parallel to each other, where each of the first pair of gear segment has teeth on one edge and a slot formed on the opposite edge, the handle rotatably mounted to the two side panels at one end of the bracket and configured to rotate between an open position and a closed position;
a second pair of gear segments rotatably mounted to the two side panels at an opposite end of the bracket, where each of the second pair of gear segment has teeth on one edge and a slot formed on the opposite edge, wherein the teeth of the second pair of gear segments are meshed with the teeth of the first pair of gear segments such that when the handle is rotated the second set of gear segments also rotate;
an interposer printed circuit assembly (PCA) comprising a printed circuit (PC) board and two connectors attached to a bottom side of the PC board, the PCA attached to a top side of the bracket;
a chassis having four insertion/ejection flanges configured to engage the four slots, the chassis having a pair of mating connectors configured to couple with the connectors on the PC board, wherein when the handle is rotated from the open position to the closed position, the slots engaged with the insertion/ejection flanges on the chassis force the connectors on the PC board into the mating connectors in the chassis.

* * * * *